United States Patent
Goshima (10) Patent No.: US 9,619,395 B2
(45) Date of Patent: Apr. 11, 2017

(54) STORAGE MEDIUM AND INFORMATION PROCESSING DEVICE FOR EXCHANGING DATA WITH SECONDARY STORAGE SECTION THROUGH CACHE

(71) Applicant: KYOCERA Document Solutions Inc., Osaka (JP)

(72) Inventor: Satoshi Goshima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/815,437

(22) Filed: Jul. 31, 2015

(65) Prior Publication Data

US 2016/0034402 A1 Feb. 4, 2016

(30) Foreign Application Priority Data

Jul. 31, 2014 (JP) ................. 2014-156363

(51) Int. Cl.
*G06F 12/0875* (2016.01)
*G06F 9/30* (2006.01)

(52) U.S. Cl.
CPC ........ *G06F 12/0875* (2013.01); *G06F 9/3001* (2013.01); *G06F 2212/452* (2013.01)

(58) Field of Classification Search
CPC ............... G06F 12/0875; G06F 9/3001; G06F 2212/452

See application file for complete search history.

(56) References Cited

U.S. PATENT DOCUMENTS

2012/0284550 A1* 11/2012 Park ................... H04N 1/00885
713/323

FOREIGN PATENT DOCUMENTS

JP 10-040170 A 2/1998

* cited by examiner

*Primary Examiner* — Eric S Cardwell
(74) *Attorney, Agent, or Firm* — Studebaker & Brackett PC (57) ABSTRACT

An information processing device includes a main control circuit including a central arithmetic processor that executes first processing through a first program, a sub-control circuit that executes second processing independently of the first processing, a primary storage circuit, and a secondary storage circuit. The secondary storage circuit has a slower access speed than the primary storage circuit. The secondary storage circuit stores a second program used for third processing executed once the first processing and the second processing are both complete. The main control circuit further includes a cache memory having a faster access speed than the secondary storage circuit and a cache controller. In a situation in which the second processing is not yet complete at a completion time of the first processing, the cache controller executes pre-reading of the second program from the secondary storage circuit and stores the second program into the cache memory.

12 Claims, 6 Drawing Sheets

Cache management table

| Program name | Program cache information |
|---|---|
|  |  |
|  |  |
|  |  |
|  |  |
|  |  |
|  |  |

STORAGE MEDIUM AND INFORMATION PROCESSING DEVICE FOR EXCHANGING DATA WITH SECONDARY STORAGE SECTION THROUGH CACHE

INCORPORATION BY REFERENCE

The present application claims priority under 35 U.S.C. §119 to Japanese Patent Application No. 2014-156363, filed Jul. 31, 2014. The contents of this application are incorporated herein by reference in their entirety.

BACKGROUND

The present disclosure relates to storage media and information processing devices for exchanging data with a secondary storage section through cache.

A generic information processing device uses a cache system to improve processing speed in a situation in which data is exchanged with an auxiliary storage device that has relatively slow processing speed.

For example, when a reading request from an application program or an operating system (OS) is generated with respect to data stored in a magnetic disk device, in addition to the data read from the magnetic disk device being passed onto a process that has requested reading of the data, the read data is also stored in a semiconductor disk device that forms a disk cache.

When another request for reading data stored in the magnetic disk device is subsequently generated, in a situation in which the requested data is also stored in the semiconductor disk device, the requested data is read from the semiconductor disk device. As a result, a central arithmetic processor can read the data at high-speed.

The semiconductor disk device is formed by flash memory. Therefore, data (cache data) stored in the semiconductor disk device is not deleted and remains stored even if the power supply to the system is cut off and the system is subsequently restarted. Therefore, when the power supply to the system is cut off, high hit ratio contents of the disk cache that have been structured up until the time that the power supply is cut off can be effectively maintained.

With respect to program code for an executed program and data that is required for processing, an OS typically reads the program code and the data into a primary storage section from a secondary storage section when reading thereof is required. The OS also performs caching of the program code and the data when performing the reading thereof.

SUMMARY

An information processing device according to an embodiment of the present disclosure includes a main control circuit, a sub-control circuit, a primary storage circuit, and a secondary storage circuit. The main control circuit includes a central arithmetic processor that executes at least first processing through at least one first program. The sub-control circuit executes second processing independently of the first processing. The primary storage circuit is accessible by the central arithmetic processor. The secondary storage circuit is accessible by the central arithmetic processor and has a slower access speed than the primary storage circuit when accessed by the central arithmetic processor. The secondary storage circuit stores a second program used for third processing executed once the first processing and the second processing are both complete. The first processing and the second processing are executed at a start-up time. The main control circuit further includes a cache memory and a cache controller. The cache memory has a higher access speed than the secondary storage circuit and performs caching of the second program when the second program is read from the secondary storage circuit and stored into the primary storage circuit. In a situation in which the second processing is not yet complete at a completion time of the first processing, the cache controller executes pre-reading of the second program from the secondary storage circuit and stores the second program into the cache memory.

A non-transitory computer-readable storage medium according to an embodiment of the present disclosure stores an information processing program for execution by a computer. The information processing program includes first program code, second program code, and third program code. The first program code causes the computer to execute first processing. In a situation in which second processing executed independently of the first processing is not yet complete at a completion time of the first processing, the second program code causes the computer to pre-read a program for executing third processing from a secondary storage circuit and perform caching of the program for subsequent reading into a primary storage circuit, wherein the third processing is processing that is executed once the first processing and the second processing are both complete. The third program code causes the computer to read the cached program into the primary storage circuit and execute the third processing.

DETAILED DESCRIPTION

The following explains an embodiment of the present disclosure with reference to the drawings.

[Overview]

First an overview explanation of an information processing device according to the present disclosure is provided. An information processing device for which the present disclosure is applicable includes a main system and at least one sub-system. In a first stage, the information processing device simultaneously commences start-up processing of the main system and the sub-system. Once the main system and the sub-system are both in a ready state, the information processing device can execute other start-up processing in a second stage. Once the other start-up processing in the second stage is complete, the information processing device is in a ready state and is useable.

The other start-up processing in the second stage for example includes a step of reading a program for performing processing into a main storage device from an auxiliary storage device and a step of executing the program that has been read into the main storage device.

In a situation in which for example start-up of the sub-system in the first stage takes time due to external factors and the length of time taken for the sub-system to reach a ready state is extended, an execution start time of the start-up processing in the second stage is typically delayed. In other words, the length of time taken for the information processing device to reach a ready state is extended by the same amount as the length of time taken for the sub-system to reach a ready state.

However, in the information processing device according to the present disclosure, in a situation in which the sub-system takes time to start-up in the first stage (i.e., when the length of time taken for the sub-system to reach a ready state is extended), the main system is already in a ready state on standby. In consideration of the above, the information processing device according to the present disclosure utilizes standby time of the main system. More specifically, the information processing device according to the present disclosure is configured such that during a period up until the sub-system reaches a ready state, the main system performs pre-reading into cache memory from an auxiliary storage device of a program for performing other processing that is to be started up in the second stage.

Therefore, once the main system and the sub-system have both reached a ready state, the program for executing the other processing in the second stage is read from the cache memory. As a result, the processing in the second stage can be completed in a shorter length of time.

In other words, when start-up of the sub-system in the first stage takes time, as a consequence of execution time of the other processing in the second stage being shortened it is possible to reduce the delay in the information processing device as a whole reaching a ready state.

The following explanation uses an image forming apparatus (more specifically a multifunction peripheral; MFP) as an example of an embodiment of the information processing device according to the present disclosure.

Through the above description, an overview of the information processing device according to the present disclosure has been provided.

[Image Forming Apparatus Configuration]

Figure 1:
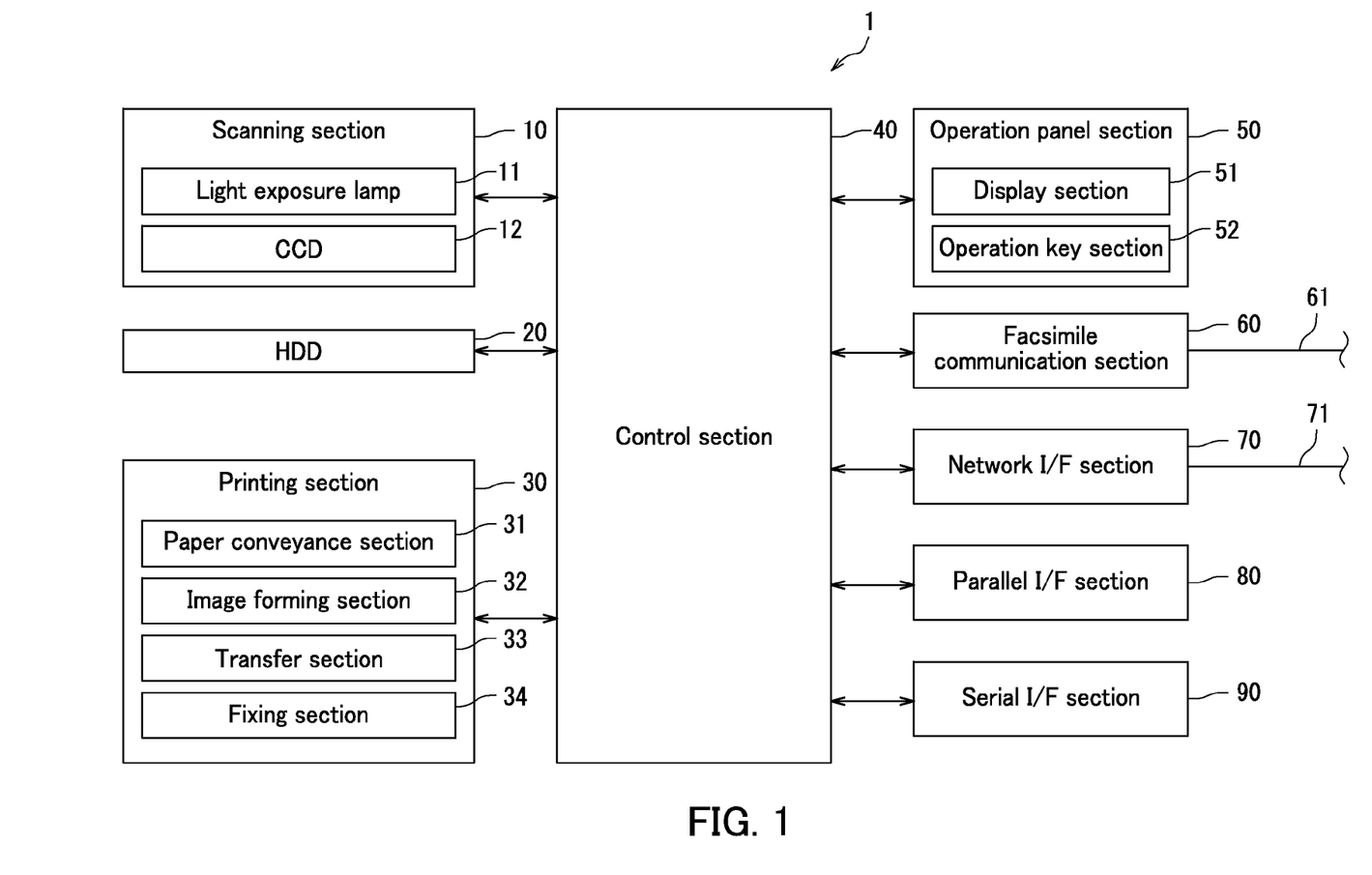
FIG. 1 illustrates an example of configuration of an image forming apparatus 1 according to an embodiment of the present disclosure.

The following explains configuration of an image forming apparatus 1 according to the embodiment of the present disclosure. FIG. 1 illustrates an example of configuration of the image forming apparatus 1 according to the embodiment of the present disclosure. The image forming apparatus 1 illustrated in FIG. 1 is a so-called "multifunction peripheral" that has various functions related to image formation such as a copying function, a printing function, a facsimile function, and a scanning function. The image forming apparatus 1 includes a scanning section 10, an HDD (secondary storage section) 20, a printing section 30, a control section 40, an operation panel section 50, a facsimile communication section 60, a network I/F section 70, a parallel I/F section 80, and a serial I/F section 90. The control section 40 is a main control circuit that corresponds to the main system described above and that executes first processing. The scanning section 10, the printing section 30, the facsimile communication section 60, and the network I/F section 70 are sub-control circuits that correspond to the sub-system described above and that execute second processing.

A network scanning function is implemented through the scanning section 10, the HDD 20, the control section 40, the operation panel section 50, and the network OF section 70. The network scanning function involves encrypting image data acquired through scanning by the scanning section 10 and transmitting the encrypted image data to a predesignated e-mail address as an e-mail. Alternatively, the image data may be transmitted directly to an IP address.

A facsimile function is implemented through the scanning section 10, the HDD 20, the printing section 30, the control section 40, the operation panel section 50, and the facsimile communication section 60. A printing function is implemented through the HDD 20, the printing section 30, the control section 40, the operation panel section 50, the network I/F section 70, and the parallel I/F section 80. A copying function is implemented through the scanning section 10, the HDD 20, the printing section 30, the control section 40, and the operation panel section 50.

The operation panel section 50 is used in order to enable a user to perform operations related to functions such as the copying function, the printing function, the facsimile function, and the scanning function. The operation panel section 50 provides operation instructions to the control section 40 from the user, such as an image formation instruction that instructs printing of information stored by the HDD 20.

The operation panel section 50 also receives input of user identification information. The user identification information for example includes a password and a user ID. The password is identification information that is only known to a user who is permitted to access confidential information. In other words, a user who knows the password is identified to be a user who is permitted to access the confidential information. The user ID is identification information for identifying an individual user.

The operation panel section 50 is a circuit that includes a display section 51 having a touch panel or the like and an operation key section 52 having keys such as a start key and a numeric keypad.

The display section 51 may for example include a touch panel circuit capable of display that is a combination of a touch panel and a liquid-crystal display (LCD). The display section 51 displays various operation screens that enable input operations by a user.

For example, during execution of the facsimile function, the display section 51 displays information relating to user selection, transmission destination selection, and transmission settings. The display section 51 also for example displays operation buttons that enable the user to input various operation instructions. The user can input various operation instructions by touching the operation buttons displayed by the display section 51.

The operation key section 52 is for example used by the user to input various instructions such as a start instruction for executing copying or a start instruction for transmitting a facsimile.

The scanning section 10 optically scans an image of a document to generate image data. The scanning section 10 is a circuit that includes a light exposure lamp 11 and a charge coupled device (CCD) 12. The scanning section 10 scans the image of the document by irradiating the document with light through the light exposure lamp 11 and receiving light reflected off the document through the CCD 12. The scanning section 10 outputs the image data corresponding to the scanned image to the control section 40. In addition to being able to scan monochrome documents, the scanning section 10 may also be able to scan color documents and photographic documents.

The HDD 20 is for example a hard disk drive that stores document image data which has been encrypted by the control section 40 and is a circuit that corresponds to an example of an auxiliary storage device. The HDD 20 may be a non-volatile semi-conductor memory such as a solid state drive (SSD).

The printing section 30 is a circuit that acquires image data from the control section 40 and prints an image on recording paper based on the image data. The image data is for example image data of a document scanned by the scanning section 10, image data received through the network I/F section 70 from an external personal computer or the like, or image data received as facsimile data through the facsimile communication section 60 from an external facsimile machine.

The printing section 30 includes a paper conveyance section 31, an image forming section 32, a transfer section 33, and a fixing section 34. The paper conveyance section 31 for example includes a paper feed cassette and a paper feed roller. The image forming section 32 for example includes an intermediate transfer roller, a photosensitive drum, a light exposure device, and a developing device. The transfer section 33 for example includes a transfer roller. The fixing section 34 for example includes a fixing roller. In the present embodiment, the printing section 30 uses electrophotography.

The paper conveyance section 31 conveys recording paper to the image forming section 32. The image forming section 32 forms a toner image corresponding to the image data described above. The transfer section 33 transfers the toner image onto the recording paper. The fixing section 34 forms an image on the recording paper by fixing the toner image thereto.

Note that the printing section 30 is not limited to using toner to form an image by electrophotography. For example, the printing section 30 may use various different methods such as an inkjet method in which an image is formed by discharging ink onto recording paper and a heat transfer method in which an image is transferred onto recording paper by heating an ink film.

In order for the printing section 30 to reach a ready state, it is for example necessary for the fixing section 34 to be heated to a specific temperature. The length of time taken for the fixing section 34 to reach the specific temperature varies based on room temperature. When room temperature is low, it takes longer to heat the fixing section 34 and, as a result, it takes longer for the printing section 30 to reach the ready state.

The facsimile communication section 60 is a circuit that includes an encoding/decoding section (not illustrated), a modulation/demodulation section (not illustrated), and a network control unit (NCU, not illustrated). The facsimile communication section 60 transmits image data acquired through scanning of a document by the scanning section 10 to another facsimile machine via a communication line 61, such as a telephone line or an internet line. The facsimile communication section 60 also receives image data transmitted from other facsimile machines.

The encoding/decoding section is a circuit that compresses and decodes image data to be transmitted and that expands and decodes image data that has been received. The modulation/demodulation section modulates compressed and decoded image data to an audio signal and demodulates a received signal (audio signal) to image data. The NCU controls connection to a transmission destination facsimile machine through a telephone line.

The network I/F section 70 is a circuit that uses a network interface (for example, 10/100base-TX) or the like to control transmission and reception of various data with a terminal device (not illustrated), such as an external personal computer, connected via a local area network (LAN) 71. The network I/F section 70 for example transmits document image data that has been acquired through scanning by the scanning section 10 and encrypted by the control section 40 to the terminal device as an e-mail. In another example, the network I/F section 70 receives image data transmitted from the terminal device for printing by the printing section 30.

The parallel I/F section 80 is a circuit that for example includes a high-speed bi-directional parallel interface (for example, in accordance with IEEE 1284). The parallel I/F section 80 for example receives printing data from an external device through parallel transfer in which data is transmitted in multi-bit units using a plurality of signal lines.

The serial I/F section 90 is a circuit that for example includes a serial interface (for example, RS-232C). The serial I/F section 90 for example receives various data from an external device through serial transfer in which data is transmitted sequentially one bit at a time using a single signal line.

The control section 40 is explained in detail below.

Through the above, an explanation of configuration of the image forming apparatus 1 has been provided.

[Control Section Configuration]

The following explains hardware configuration and software configuration of the control section 40 of the image forming apparatus 1.

Figure 2:
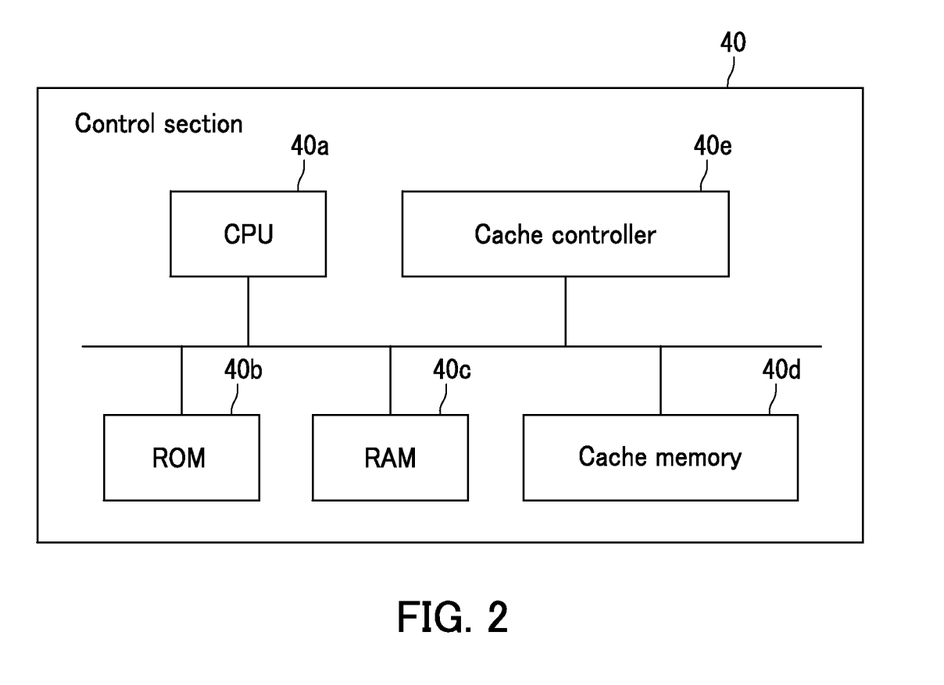
FIG. 2 illustrates hardware configuration of a control section 40 of the image forming apparatus 1.

FIG. 2 illustrates hardware configuration of the control section 40 of the image forming apparatus 1. Hardware of the control section 40 is a computer including a central processing unit (CPU) 40$a$, read only memory (ROM) 40$b$, random access memory (RAM, primary storage section) 40$c$, cache memory 40$d$, a cache controller 40$e$, and peripherals thereof. The ROM 40$b$ stores a control program. The CPU 40$a$ accesses the HDD 20 and the RAM 40$c$. The CPU 40$a$ executes first processing by executing at least one program. The RAM 40$c$ serves as a program work area in which a program executed by the CPU 40$a$ is developed. The cache memory 40$d$ temporarily stores data that is exchanged with the HDD 20. The cache controller 40$e$ manages the cache memory 40$d$.

The RAM 40$c$ corresponds to an example of a main storage device. Also, a section of the RAM 40$c$ may be used as the cache memory 40$d$. A device used as the cache memory 40$d$ has a faster access speed than the HDD 20 when data stored therein is accessed by the CPU 40$a$—in other words, data stored in the cache memory 40$d$ can be accessed faster by the CPU 40$a$ than data stored in the HDD 20.

Through the configuration described above, the control section 40 performs control of the image forming apparatus 1 as a whole based on instruction information received by, for example, the operation panel section 50 and detection signals from sensors located at various positions in the image forming apparatus 1.

Figure 3:
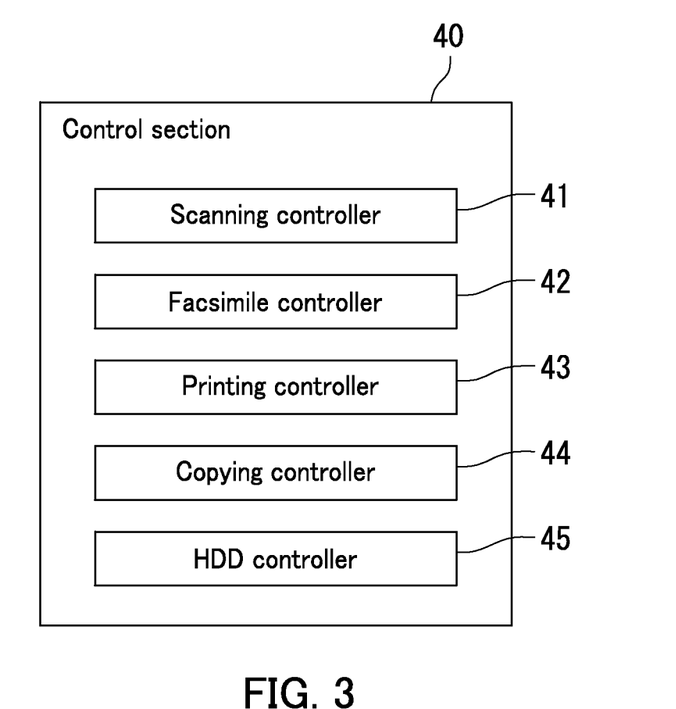
FIG. 3 illustrates software configuration of the control section 40 of the image forming apparatus 1.

FIG. 3 illustrates software configuration of the control section 40 of the image forming apparatus 1. The control section 40 functions as a scanning controller 41, a facsimile controller 42, a printing controller 43, a copying controller 44, and an HDD controller 45 by executing a control program (third processing) stored in the ROM 40$b$ and the HDD 20. Note that the third processing is processing that cannot be executed until the first processing and the second processing are both complete. The third processing is processing that is executed once the second processing is complete.

The control section 40 that is a computer implements the aforementioned functions by executing the program. The program for implementing the aforementioned functions is stored in the HDD 20 (secondary storage section) that is a non-volatile mass storage device. The HDD 20 is larger in capacity than the RAM 40c. The program for implementing the aforementioned functions is appropriately transferred to a main storage device such as the RAM 40c when the program is to be executed by the CPU 40a.

The scanning controller 41 controls operation of each section used to implement the scanning operation. The scanning controller 41 is in a ready state once the scanning section 10 is in a useable state.

The facsimile controller 42 controls operation of each section used to implement the facsimile function. The facsimile controller 42 specifies a telephone number from among telephone numbers stored in the HDD 20 when a facsimile is to be transmitted. The facsimile controller 42 controls the facsimile communication section 60 so as to transmit image data of a document scanned by the scanning section 10 to an external facsimile machine indicated by the specified telephone number, via the communication line 61. The facsimile controller 42 is in a ready state once the facsimile communication section 60 is in a useable state.

The printing controller 43 controls operation of each section used to implement the printing function. The printing controller 43 is in a ready state once the printing section 30 is in a useable state.

The copying controller 44 controls operation of each section used to implement the copying function. The copying controller 44 is in a ready state once the scanning section 10 and the printing section 30 are in a useable state.

The HDD controller 45 performs initialization and partitioning of the HDD 20. The HDD controller 45 also performs I/O control of reading and writing of data. The HDD controller 45 is in a ready state once the HDD 20 is in a useable state.

Through the above, an explanation of hardware configuration and software configuration of the control section 40 of the image forming apparatus 1 has been provided.

[Processing Flow]

Figure 4:
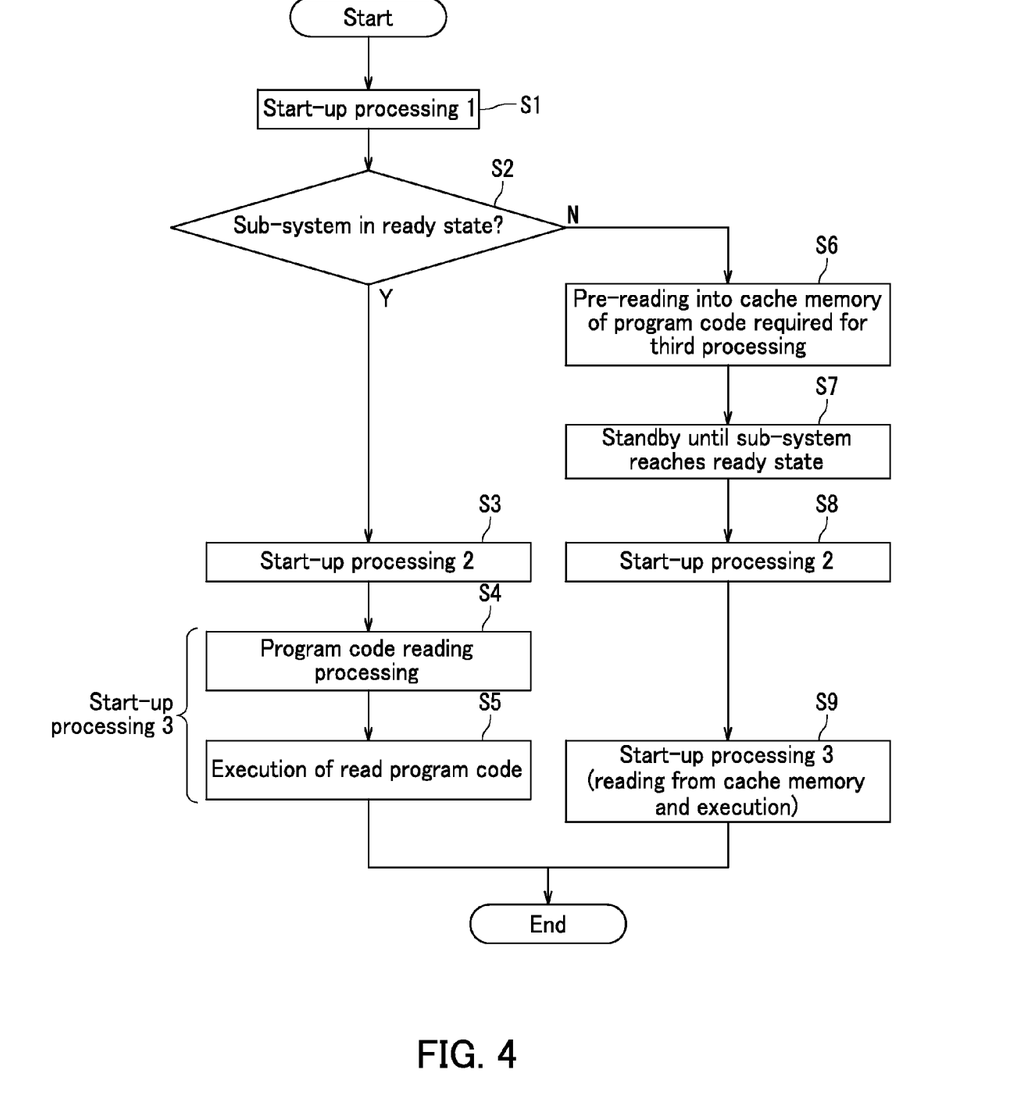
FIG. 4 illustrates processing steps in an information processing device according to the present disclosure.

The following explains processing flow in the information processing device according to the present disclosure. FIG. 4 illustrates processing steps in the information processing device according to the present disclosure.

Note that in the flowchart in FIG. 4, the general term "sub-system" is used instead of the various specific terms such as "printing section 30". Also, the term "main system", which forms a pair with the term "sub-system", is used instead of the term "control section 40". In the example illustrated in FIG. 4, the main system executes start-up processing 1m, start-up processing 2, and start-up processing 3, and the sub-system executes start-up processing 1s.

First, upon power to the information processing device (image forming apparatus 1) being turned on, the main system and the sub-system commence start-up processing 1 (Step S1).

In the present embodiment, the start-up processing 1 includes the start-up processing 1m (first processing) executed by the main system and the start-up processing 1s (second processing) executed by the sub-system. The start-up processing is and the start-up processing 1m are performed in parallel, independently of one another.

Next, once the main system has completed the start-up processing 1m, the main system determines whether or not the sub-system is in a ready state (Step S2). More specifically, the main system determines whether or not the sub-system has completed the start-up processing is and is thus in a ready state.

In a situation in which the main system determines that the sub-system is in a ready state (Step S2: Y), the main system next executes the start-up processing 2 (Step S3). Note that the start-up processing 2 (third processing) is processing that cannot be executed until the start-up processing 1m and start-up processing 1s are both complete. Also, the start-up processing 3 is processing that is executed once the start-up processing 2 is complete.

Next, the main system reads program code that is required for executing the start-up processing 3 (third processing) into the RAM 40c (primary storage section) from the HDD 20 (secondary storage section), through the cache memory 40d (Step S4). The main system subsequently executes the program that has been read into the RAM 40c (Step S5).

In Step S2, in a situation in which the start-up processing 1s is not yet complete and the sub-system is not yet in a ready state (Step S2: N), the cache controller 40e pre-reads the program code required for executing the start-up processing 3 into the cache memory 40d from the HDD 20 (secondary storage section) (Step S6).

Figure 5:
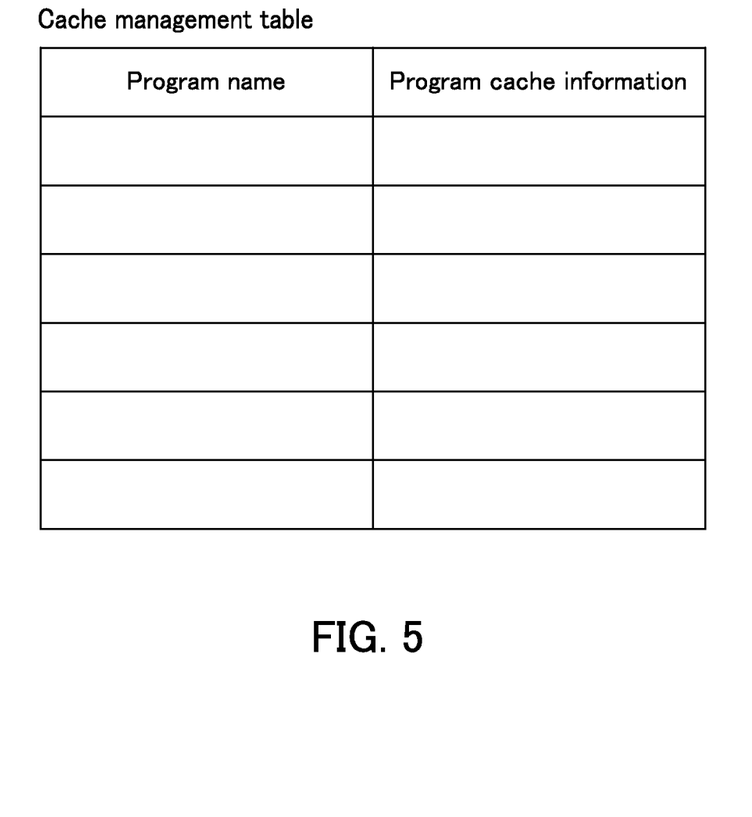
FIG. 5 illustrates an example of a cache management table according to the present disclosure.

The cache controller 40e pre-reads the program code based on program cache information. The program cache information stipulates, for each of a plurality of programs, whether or not pre-reading of the program into the cache memory 40d is required. For example, as illustrated in FIG. 5, the cache controller 40e pre-reads the program code based on information in a cache management table that manages groupings of program names and program cache information.

The cache controller 40e may store the cache management table in local memory. Alternatively, the cache management table may be stored in the RAM 40c or the HDD 20.

Next, the main system remains on standby until the sub-system reaches a ready state (Step S7).

Once the sub-system is in a ready state, the main system executes the start-up processing 2 (Step S8).

Next, the main system executes reading into the RAM 40c of the program code required for executing the start-up processing 3 that has been cached in the cache memory 40d (Step S9).

Through the above, an explanation of processing flow in the information processing device according to the present disclosure has been provided.

[Specific Examples of Start-Up Processing Execution Timing]

Figure 6:
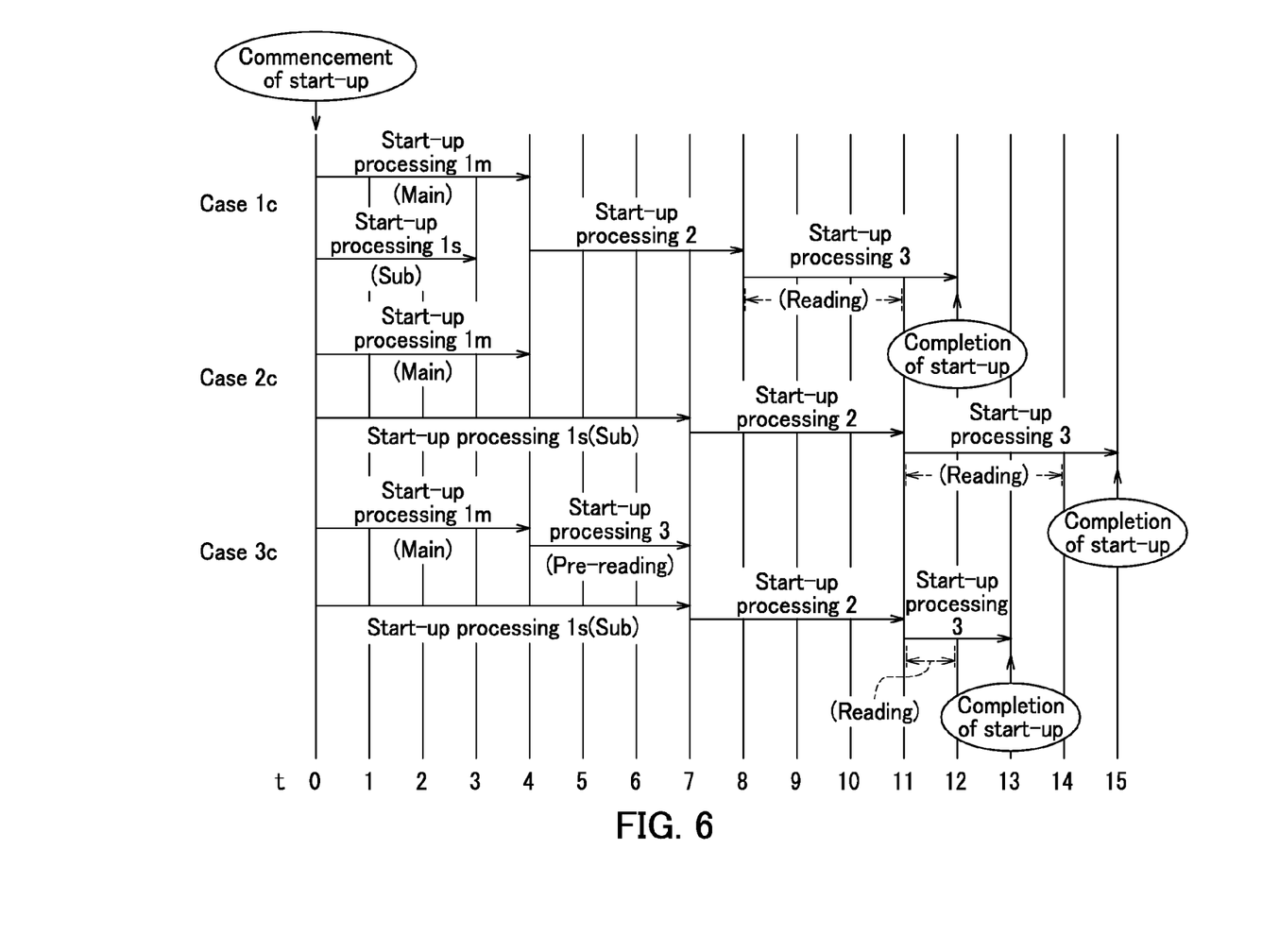
FIG. 6 illustrates a specific example of timing of start-up processing of an information processing device according to the present disclosure.

The following explains a specific example of timing of start-up processing in the information processing device according to the present disclosure. FIG. 6 illustrates the specific example of timing of the start-up processing in the information processing device according to the present disclosure. The horizontal t-axis in FIG. 6 represents time.

A start time and an end time of each processing are shown in FIG. 6 for three different cases. Case 1c is a situation in which the start-up processing 1s (second processing) of the sub-system is already complete at a time of completion of the start-up processing 1m (first processing) of the main system.

Case 2c is a situation in which the start-up processing 1s of the sub-system is not yet complete at the time of completion of the start-up processing 1m of the main system and in which the program code required for the start-up processing 3 is read once the start-up processing 2 is complete.

Case 3c is a situation in which the start-up processing 1s of the sub-system is not yet complete at the time of completion of the start-up processing 1m of the main system and in which the program code required for the start-up processing 3 is pre-read in parallel to the start-up processing 1*s*.

The following explains each of the cases in detail.

In case 1*c*, the start-up processing is of the sub-system is already complete at the time of completion (t=4) of the start-up processing 1*m* of the main system. Therefore, the start-up processing 2 can commence at the time of completion (t=4) of the start-up processing 1*m* of the main system. Once the start-up processing 2 is complete (t=8), the program code required for the start-up processing 3 is read into the RAM 40*c* (primary storage section) from the HDD 20 (secondary storage section), through the cache memory 40*d* (t=8 to t=11). Once the program code has been read (t=11), the program required for the start-up processing 3 is executed and start-up of the information processing device as a whole is complete when t=12.

In case 2*c*, the start-up processing 1*m* is complete when t=4 in the same way as in case 1*c*. The start-up processing is of the sub-system takes longer than the start-up processing 1*m* of the main system and is complete when t=7. As a consequence, commencement of the start-up processing 2 is delayed until the time of completion (t=7) of the start-up processing is of the sub-system, and completion of start-up of the information processing device as a whole is delayed to when t=15.

In case 3*c*, the start-up processing 1*m* of the main system is complete when t=4 and the start-up processing is of the sub-system is complete when t=7 in the same way as in case 2*c*. Until the start-up processing is of the sub-system is complete, the main system performs pre-reading into the cache memory 40*d* from HDD 20 (secondary storage section) of the program code required for the start-up processing 3 (period from t=4 to t=7).

Once the start-up processing 2 is complete (t=11), reading into the RAM 40*c* (primary storage section) from the cache memory 40*d* is performed for the program code required for the start-up processing 3 (t=11 to t=12). Next, the program required for the start-up processing 3 is executed from when t=12 and start-up of the information processing device as a whole is complete when t=13.

The access speed of data stored in the cache memory 40*d* is faster than the access speed of data stored in the HDD 20. Therefore, reading time of the program into the RAM 40*c* from the cache memory 40*d* (Δt=1) is shorter than reading time of the program into the RAM 40*c* from the HDD 20 (Δt=3).

As a result, start-up of the information processing device as a whole can be completed by when t=13, even though the start-up processing 3 does not commence until when t=11.

Through the above, an explanation of a specific example of timing of start-up processing in the information processing device according to the present disclosure has been provided. Through the present embodiment, in a situation in which completion of the start-up processing 2 is delayed, the length of any resultant delay in completion of the start-up processing 3 can be reduced by pre-reading program code or data required for the start-up processing 3 into cache memory.

[Supplementary Explanation]

The present disclosure is of course not limited to the embodiment described above and various alterations may be made without deviating from the essence of the present disclosure.

What is claimed is:

1. An information processing device comprising:
   a main control circuit including a central arithmetic processor that executes at least first processing through at least one first program;
   a sub-control circuit that executes second processing independently of the first processing;
   a primary storage circuit that is accessible by the central arithmetic processor; and
   a secondary storage circuit that is accessible by the central arithmetic processor and that has an access speed to and from the central arithmetic processor that is slower than that of the primary storage circuit, wherein
   the first processing and the second processing are executed at a start-up time,
   the secondary storage circuit stores a second program used for third processing,
   the third processing is executed once the first processing and the second processing are both complete,
   the main control circuit further includes:
     a cache memory that has a faster access speed than the secondary storage circuit and
     a cache controller that stores the second program into the cache memory,
   the main control circuit determines whether or not the second processing is complete at a completion time of the first processing,
   when determining that the second processing is complete at a completion time of the first processing, the main control circuit reads the second program into the primary storage circuit from the secondary storage circuit via the cache memory and executes the third processing, and
   when determining that the second processing is not yet complete at a completion time of the first processing, the main control circuit causes the caching controller to
     commence pre-reading of the second program from the secondary storage circuit in execution of the second program,
     cause the cache memory to perform caching of the second program,
     read the second program into the primary storage circuit from the cache memory after completion of the second processing, and
     execute the third processing.

2. The information processing device according to claim 1, wherein
   the secondary storage circuit stores a plurality of programs,
   the plurality of programs include the second program, and
   the cache controller executes the pre-reading of the second program into the cache memory based on program cache information stipulating for each of the plurality of programs whether or not pre-reading of the program into the cache memory is required.

3. The information processing device according to claim 1, wherein the sub-control circuit includes a printing circuit that prints an image based on image data.

4. The information processing device according to claim 1, wherein the first processing and the second processing commence simultaneously.

5. The information processing device according to claim 1, wherein
   the first processing is start-up processing of the main control circuit that commences at a start-up of the information processing device,
   the second processing is start-up processing of the sub-control circuit that commences at a start-up of the information processing device, and the third processing is processing that enables a function of the information processing device to be usable.

6. The information processing device according to claim 1, wherein
the second processing commences independently of the first processing and is executed in parallel to the first processing.

7. A non-transitory computer-readable storage medium storing thereon an information processing program for execution by a computer,
the information processing program comprising:
first program code that causes the computer to execute first processing;
second program code that causes the computer to determine whether or not second processing executed independently of the first processing is complete at a completion time of the first processing
third program code that when the computer determines that the second processing is complete at a completion time of the first processing, causes the computer to read a program for executing third processing into a primary storage circuit from a secondary storage circuit via a cache memory and execute the third processing, the third processing being executed once the first processing and the second processing are both complete; and
fourth program code that when the computer determines that the second processing is not yet complete at a completion time of the first processing, cause the computer to
commence pre-reading of a program for executing the third processing from the secondary storage circuit in execution of the second processing to cause the cache memory to perform caching of the program for executing the third processing,
read, once the second processing is complete, the program for executing the third processing into the primary storage circuit from the cache memory, and execute the third processing.

8. The non-transitory computer-readable storage medium according to claim 7, wherein
the secondary storage circuit has an access speed to and from a central arithmetic processor that is slower than that of the primary storage circuit when accessed by a central arithmetic processor of the computer.

9. The non-transitory computer-readable storage medium according to claim 7, wherein
the first processing and the second processing commence simultaneously.

10. The non-transitory computer-readable storage medium according to claim 7, wherein
the first processing is start-up processing of a main control circuit that commences at a start-up of the computer,
the second processing is start-up processing of a sub-control circuit that commences at a start-up of the computer,
the third processing is processing that enables a function of the computer to be usable, and
the computer includes the main control circuit and the sub-control circuit.

11. The non-transitory computer-readable storage medium according to claim 7, wherein
the second processing commences independently of the first processing and is executed in parallel to the first processing.

12. The non-transitory computer-readable storage medium according to claim 7, wherein
the secondary storage circuit stores a plurality of programs,
the plurality of programs includes the program for executing the third processing, and
the fourth program code causes the computer to execute the pre-reading of the program for executing the third processing into the cache memory based on program cache information stipulating for each of the plurality of programs whether or not pre-reading of the program into the cache memory is required.

* * * * *